United States Patent [19]

Warnock

[11] 3,975,210

[45] Aug. 17, 1976

[54] METAL-GAS BATTERY WITH AXIAL REACTANT GAS STORAGE CAVITY

[75] Inventor: Don R. Warnock, Centerville, Ohio

[73] Assignee: The United States of America as represented by the Secretary of the Air Force, Washington, D.C.

[22] Filed: Mar. 27, 1975

[21] Appl. No.: 563,010

[52] U.S. Cl............................................... 136/86 A
[51] Int. Cl.² ............................................ H01M 8/02
[58] Field of Search ................................... 136/86 A

[56] References Cited
UNITED STATES PATENTS

| | | | |
|---|---|---|---|
| 2,938,064 | 5/1960 | Kordesch | 136/86 A |
| 3,575,720 | 4/1971 | Craig | 136/86 A |
| 3,850,694 | 11/1975 | Dunlop | 136/86 A |

*Primary Examiner*—John H. Mack
*Assistant Examiner*—H. A. Feeley
*Attorney, Agent, or Firm*—Joseph E. Rusz; Robert Kern Duncan

[57] ABSTRACT

The structure of a cell for a metal-gas battery is disclosed in which the cell components comprising the electrodes, separators, and electrolyte reservoirs are substantially planar structures, circular in shape and having a hole at the center. These components are stacked on a common axis perpendicular to their planar surfaces to form individual electrochemical cells. Individual cells may be similarly stacked to form a battery. The stack of flat ring-shaped components comprising a cell is enclosed in a plastic insulating cell case member providing a reactant gas manifold space at the inner circumference of the cell stack components inside the plastic enclosure. On the inner circumference of the plastic cell case member are positioned ports covered with a non-wetting porous plastic membrane of Teflon. The porous membrane allows the reactant gas to pass freely through the port from the main axial reactant gas storage space in the center cavity of the cell into the manifold volume, but will not allow liquid electrolyte to pass through the membrane and escape from the cell stack. The cell (or battery) is enclosed in a conventional pressure vessel having conventional electrical connections.

1 Claim, 3 Drawing Figures

METAL-GAS BATTERY WITH AXIAL REACTANT GAS STORAGE CAVITY

RIGHTS OF THE GOVERNMENT

The invention described herein may be manufactured and used by or for the Government of the United States for all governmental purposes without the payment of any royalty.

BACKGROUND OF THE INVENTION

The field of the invention is in the metal-gas battery art.

Metal-gas batteries (such as a nickel-hydrogen or silver-hydrogen) are well known. They are conventionally composed of a number of cells, either connected in series or parallel, contained in single cylindrical pressure vessel that encloses the individual electrochemical cells. In many of the prior art devices the reactant gas storage volume is outside of the geometric envelope of the cell stack. Typical prior art metal-gas batteries and battery cells are exemplified in U.S. Pat. No. 3,317,349 to patentees W. E. Elliott et al.; U.S. Pat. No. 3,565,691 to patentees M. P. Strier et al.; and U.S. Pat. No. 3,669,744 to patentees B. E. Tsenter et al.

SUMMARY OF THE INVENTION

The invention provides a novel compact cell and battery structure wherein the cell components are in the form of annuli of thin rectangular cross sections (like a large, flat, round washer), and the cell components are stacked along a common central axis to provide a cell that is also in the shape of an annulus having a rectangular cross section. The reactant gas storage is substantially within the geometric envelope of the cell (and battery) component stack and a common reactant gas volume along the axis in the hollow center of the stack is utilized by a plurality of cells by having each cell separated from the common gas storage volume by a hydrophobic non-wetting porous plastic membrane which provides for the free flow of the reactant gas from the axial storage cavity into the individual cells but which prevents the passage of any electrolyte from the cell. The unique structure provides for better heat transfer from the cell stack to the pressure vessel from which the heat may be conventionally extracted and it greatly reduces the amount of passive surfaces thus minimizing the loss of electrolyte from the cell component stack to the inner wall of the pressure vessel or to other large passive surfaces from which it is difficult to return the electrolyte to the cell.

DESCRIPTION OF THE PREFERRED EMBODIMENT

This invention relates to the structural arrangement of metal-gas cells and batteries. It is to be understood that the terminology cell generally refers to a single unit producing a dc voltage by converting chemical energy into electrical energy and that the term battery generally indicates two or more cells interconnected electrically and contained in a common enclosure that is provided with suitable electrical connecting terminals. However, a single cell enclosed in a container and provided with electrical terminals is sometimes referred to as a battery, and sometimes a plurality of cells all connected in parallel so that the output voltage is substantially that of a single cell, and contained in a common enclosure, is referred to as a cell rather than a battery. This invention pertains to the cell structure of a metal-gas electrical energy producing device and its enclosure in a pressure vessel whether the pressure vessel contains a single cell or a plurality of cells. Generally, the invention will be applied to structuring a battery composed of a plurality of cells.

Figure 1:
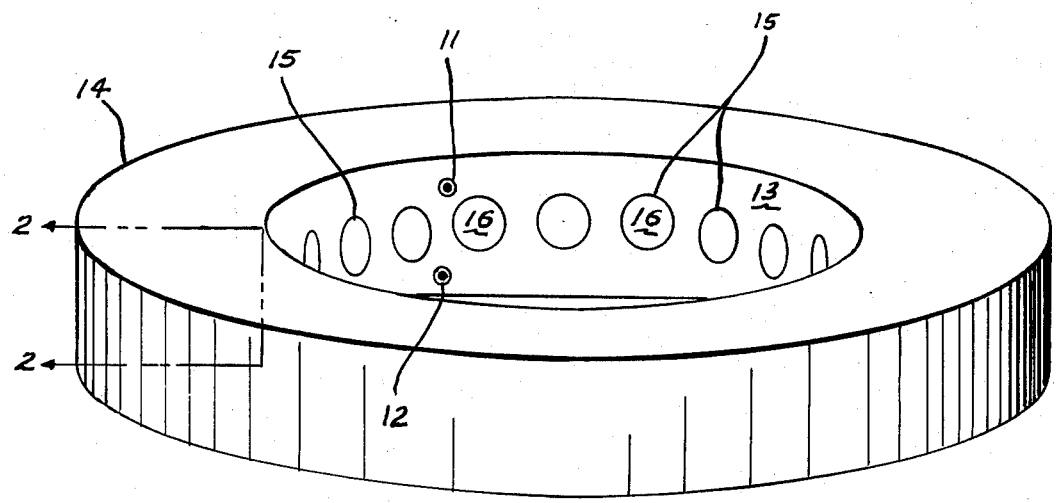
FIG. 1 is a pictorial representation of a typical plastic enclosed cell stack.

FIG. 1 shows pictorially a typical cell structure. It provides unit cell voltage at terminals 11 and 12 when enclosed in a conventional pressure vessel and having the volume within the inner peripheral surface 13 along the axis of the cell filled with a reactant gas. The plastic cell case 14, which is also in the shape of an annulus of rectangular cross section, has a plurality of windows or ports 15 covered with a hydrophobic gas permeable membrane 16. Porous Teflon is the generally preferred membrane material, however, other membrane materials such as palladium foil may be used.

Figure 2:
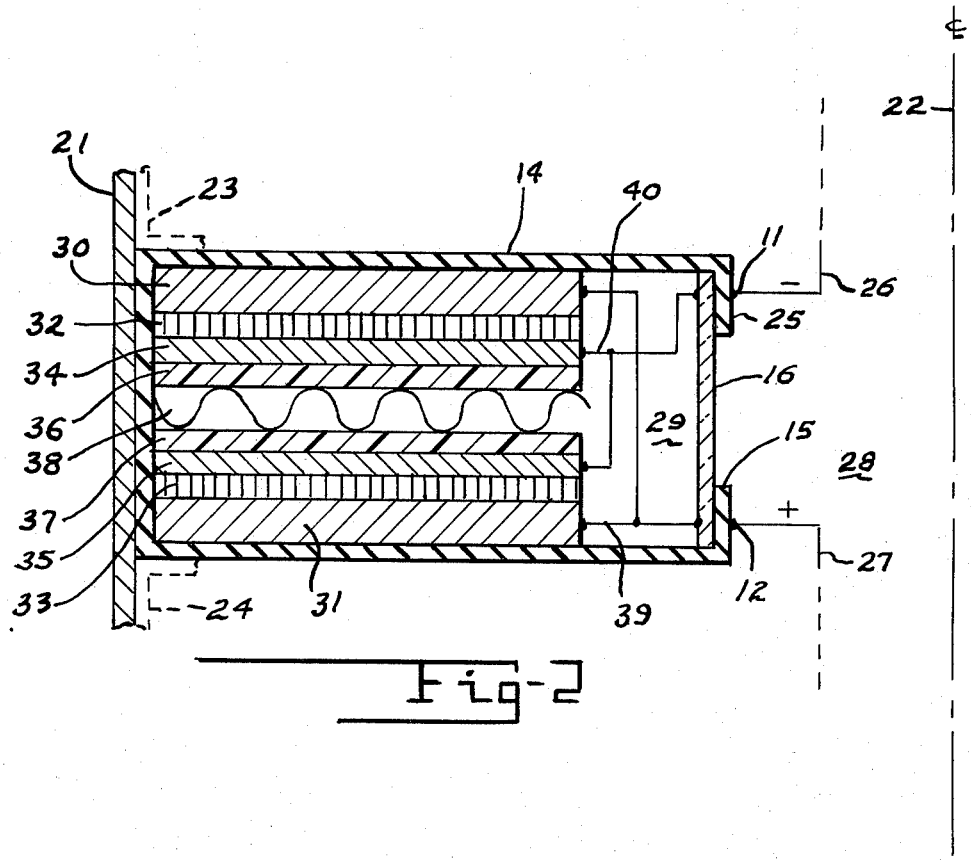
FIG. 2 is a partial section, schematic representation of the cross section 2—2 of the cell shown in FIG. 1.
Figure 3:
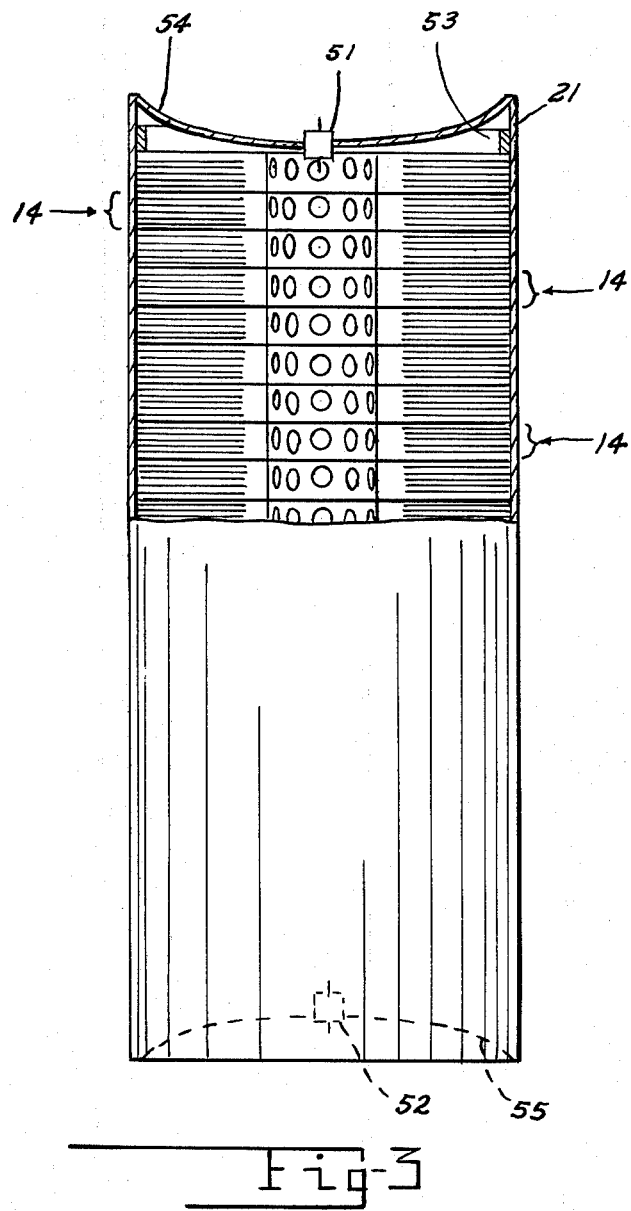
FIG. 3 is a pictorial schematic view of a typical metal-gas battery with a broken away section showing the cell stack.

A partial schematic cross section 2—2 of the cell of FIG. 1 is shown in FIG. 2. FIG. 2, in addition to schematically showing the cross section 2—2 of FIG. 1, shows the containing pressure vessel wall 21, the axial centerline 22 of the cell, and how additional similar cells 23 and 24 would stack with the cell 14 in the fabrication of a battery. A representative schematic view of a 22 cell battery is shown in FIG. 3. The conventional wiring from the individual cells, such as conductors 26 and 27 from cell 14, shown in FIG. 2, to the terminals 51 and 52, shown in FIG. 3, runs through the axial reactant gas storage cavity 28 and is not shown.

A typical nickel-hydrogen secondary (rechargeable) metal-gas cell and battery will be described in detail as a specific embodiment of the invention. A secondary cell is frequently referred to as a storage cell. The invention is not limited to this particular embodiment but also encompasses other metal-gas electrochemical couples such as silver-hydrogen, and zinc-oxygen.

The generally flat, ring shape of the cells as shown in FIG. 1 and the axial stacking of them as shown in FIG. 3 has fostered as general reference of "pineapple" to the cell and battery due to the resemblance of the structure to the conventional well known canned, sliced pineapple product. This "pineapple" design provides for good heat transfer from the heat generating elements in the cell stack to the pressure vessel 21 where it can be removed efficiently. This design also provides for an axial reactant gas storage volume in the hollow center 28 of the ring stack. This hollow center volume in addition to providing a reactant gas storage volume also provides an economical and efficient location in which to place the wiring or interconnecting tabs connecting the cells together in a battery. (In some prior art designs the electrical wiring has been attached to the outer periphery of the cells and has greatly impeded good heat transfer from the cells to the pressure vessel.) The pineapple design with central axial reactant gas storage provides additional improvement in heat transfer from the individual cells in that for cells of a given storage capacity, with other aspects of cell design and technology being equal, the pineapple shaped cell stack will have a larger perimeter area for heat transfer. This is because of the way the cell stack material is effectively distributed in a relatively thin volume close to the inner surface of the pressure vessel as opposed to a more concentrated central volume "monoblock" cell stack as in previous structures. The unique pineapple structure also provides for the holding of the cell stack components relative to each other by virtue of their contact at their outer circumference with the common inner cylindrical surface of the pressure vessel. Thus, complicated and extensive mechanical supporting and positioning devices to locate and hold the cells as used in prior art devices are not required. In this unique structure in which the shape of the cell positions it laterally in the enclosing pressure vessel, the only positioning structure required is a compressional ring 53 at each end of the cell stack.

The construction of a typical individual cell is shown in detail in FIG. 2. The hermetically sealed pressure vessel 21 is of conventional construction typical with metal-gas and fuel cell enclosures. It may have concave end members 54 as illustrated in FIG. 3 or the end members may be convex. Generally, but not necessarily, they will be bowed one way or the other for strength. The volumes contained under the end members may also provide an additional reactant gas storage volume. Electroformed nickel or type 304L stainless steel are suitable materials. Typical filament wound support of the pressure vessel will provide lower pressure vessel weight at some increase in manufacturing cost. Conventional electrical terminals and seals such as the "Ziegler" type seal and other commonly used hermetic compression seals such as used for alkaline batteries and nickel-cadmium batteries are suitable for sealing around the conventional nickel terminal rods as shown at 51 and 52 in FIG. 3. In typical embodiments of the invention, such as being described, the pressure vessel 21 must be suitable for withstanding the pressure of the reactant gas over the operating temperature range. Typically, an approximate range of operating temperature of the reactant gas is from −20°F to 110°F, and the gas pressures are from approximately 100 psi to 800 psi.

The electrical connection leads 26 and 27 as shown in FIG. 2 may either directly penetrate the inner circumference 25 of the cell enclosure or the connection may be made through conventional nickel terminals mounted in the cell case. Generally, the terminals are preferred. In whatever way electrical conduction is carried through the cell wall, it should be in sealing relationship with the cell wall to prevent leakage of liquid electrolyte through the enclosure at the points of penetration. The seal is important but not critical. There is substantially no pressure differential across the cell enclosure wall, thus sealing is not difficult and small amounts of leakage of electrolyte can be tolerated although not desirable. The gas ports 15 provide reactant gas communication between the axial gas storage chamber 28 and the cell reactant gas manifold volume 29 through the non-wetting porous membrane 16. The cell manifold volume 29 at the inner circumference of cell stack components and inside the cell case 14 promotes movement of the reactant gas from interelectrode reactant gas flow space to, and through, the enclosure ports. The gas manifold volume 29 and the ports 15, providing for the gas flow from the manifold to the axial reactant gas storage volume 28, are preferably located at the inner circumference of the cell case 14, as shown in FIG. 2. This is not a strict requirement. The reactant gas from the axial storage volume may enter the gas flow space 38 from ducts or tubes extending the length of the cell stack at the outer periphery of the cell stack adjacent the pressure vessel wall. In these embodiments the reactant gas flows from the axial storage volume across the end volumes, through the longitudinal ducts, and through a non-wetting gas permeable membrane into the cell gas flow spaces.

The individual cell component stack comprising the positive electrodes 30 and 31, the separators 32 and 33, the gas electrodes 34 and 35, the electrolyte reservoirs 36 and 37, and the gas flow space and screen 38, is surrounded by the plastic cell case 14. The cell case 14 is impermeable to the liquid electrolyte, and is electrically insulating. It is also desirable that the cell case 14 be of non-wetting material such as Teflon so that the electrolyte will not settle out and adhere to the case. The plastic case 14 completely encloses the cell component stack except for the ports 15. The ports 15 are covered by the strip of non-wetting porous membrane 16 which is conventionally sealed to the solid plastic enclosure 14 around each port. Alternatively, the port 15 may be filled with porous Teflon bonded circumferentially to the edges of the port openings. The porous Teflon membrane 16 allows the reactant gas to pass freely through the port, but will not allow liquid electrolyte to pass through and escape from the cell component stack. The non-wetting character of the membrane and of the solid plastic enclosure tends to reject liquid electrolyte from their surfaces in favor of the cell stack components such as the electrodes, separators, and reservoirs which are hydrophillic.

The typical embodiment of the metal-gas cell and battery being described in detail is of the nickel-hydrogen type, i.e., one electrode is substantially nickel, the gas electrode is porous Teflon and platinum, the electrolyte is aqueous potassium hydroxide, (approximately a 30%, by weight, solution), and the reactant gas is hydrogen. The positive electrodes 30 and 31 are preferably fabricated from eighty percent porous sintered nickel plaque on a perforated nickel sheet substrate impregnated with nickel-hydroxide active material. Such electrodes are commonly used in nickel-cadmium cells and are further described in U.S. Pat. No. 3,827,911 issued to patentee D. F. Pickett. Alternatively, though generally not as desirable, positive electrodes may be fabricated on nickel wire screen substrates and chemically impregnated with nickel-hydroxide. (Silver-oxide electrodes are used instead of the nickel-hydroxide electrodes, in silver-hydrogen cells.)

The negative electrodes (commonly called gas electrodes) 34 and 35 are typically fabricated from porous Teflon bonded with 10 milligrams of platinum black catalyst per square centimeter of electrode area, all on 50 mesh nickel screen substrate. The intracell electrical connections 39 and 40 and the intercell electrical connections 26 and 27 are made with nickel wire. The intracell wires are spot welded to the perforated nickel sheet substrates of the positive electrodes and to the nickel screens of the negative electrodes. The conductor wires are also spot welded to the nickel rod terminals communicating through the cell case and to the nickel rod battery terminals 51 and 52. The separators 32 and 33 are preferably fabricated from asbestos or potassium titanate. Other materials from which the separators may be fabricated are non-woven polypropylene (such as RIA Research Corporation type 1242-1) and nylon.

The electrolyte reservoirs 36 and 37 are fabricated from eighty percent porous polysulfone material having a thin surface film of nickel to make it wettable. Such electrolyte reservoirs are known in the metal-gas and fuel cell battery art. A description of such reservoirs may be found in NASA report CR-121136 PWA-4542 (1972) entitled "Final Report Development of Advanced Fuel Cell Systems" at pages 47 to 59.

The gas flow space and screen spacer 38 provides a substantially open passage for the reactant gas from the manifold 29 to flow through to the electrolyte reservoirs 36 and 37. The screen, which is preferably an open mesh polypropylene screen, provides the physical separation between the reservoirs to maintain the gas flow space. While polypropylene screen material is preferred other open grid structures of plastic or metal such as polysulfone, nylon, and Teflon; or nickel and silver may be used.

In a typical embodiment as described, typical approximate physical dominions of the major parameters of a cell having a nominal 20 watt rating are; cell component annuli outer radii three inches and inner radii 2.5 inches; with individual components thicknesses of: positive plate (electrode) (ea.) 0.030 inches; separator (ea.) 0.007 inches, negative electrode (ea.) 0.007 inches; electrolyte reservoir (ea.) 0.015 inches; gas flow space 0.050 inches; weight of electrolyte 0.22 pounds; and nominal maximum operating hydrogen pressure 400 pounds per square inch.

I claim:

1. A hermetically sealed metal-gas secondary cell comprising:
    a. A cell component stack of cell elements fabricated in the form of annuli of thin rectangular cross section, all having substantially equal annuli outside diameters and substantially equal annuli inside diameters and stacked to provide a cell having a common annulus axis, the said elements comprising:
        1. a hydrophillic positive electrode fabricated from approximately 80 percent porous sintered nickel plaque on a perforated nickel sheet substrate impregnated with nickel-hydroxide,
        2. a hydrophillic separator fabricated from asbestos,
        3. a negative electrode fabricated from porous Teflon bonded with approximately 10 milligrams of platinum black catalyst per square centimeter of electrode area on approximately a 50 mesh nickel screen substrate,
        4. a hydrophillic electrolyte reservoir fabricated from approximately 80 percent porous polysulfone having a nickel surface film,
        5. a gas flow space provided by an open mesh polypropylene screen positioned adjacent the said electrolyte reservoir;
    b. a hydrophobic annulus cell case of rectangular cross section enclosing the said cell component stack and providing a cell manifold volume within the said cell case;
    c. a hermetically sealed pressure vessel containing the said cell case and providing an axial reactant gas storage volume in the space along the cell annulus axis inside the inner circumference of the cell case annulus;
    d. a communicating port positioned on the inside circumference of the said cell case annulus between the said cell manifold volume and the said axial reactant gas storage volume;
    e. a hydrophobic gas permeable Teflon membrane positioned over the said port in sealing relationship;
    f. an electrolyte of potassium hydroxide in aqueous solution positioned in the said cell case;
    g. hydrogen reactant gas positioned within the said pressure vessel; and
    h. means for making separate electrical connections from exterior the said hermetically sealed pressure vessel with the said positive electrode and with the said negative electrode.

* * * * *